(12) United States Patent
Bestgen et al.

(10) Patent No.: US 9,189,047 B2
(45) Date of Patent: Nov. 17, 2015

(54) ORGANIZING DATABASES FOR ENERGY EFFICIENCY

(75) Inventors: Robert J. Bestgen, Rochester, MN (US); Wei Hu, Middleton, WI (US); Shantan Kethireddy, Chicago, IL (US); Andrew P. Passe, Rochester, MN (US); Ulrich Thiemann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1943 days.

(21) Appl. No.: 12/117,047

(22) Filed: May 8, 2008

(65) Prior Publication Data

US 2009/0282272 A1 Nov. 12, 2009

(51) Int. Cl.
*G06F 17/30* (2006.01)
*G06F 1/32* (2006.01)
*G06F 1/20* (2006.01)

(52) U.S. Cl.
CPC .............. *G06F 1/3203* (2013.01); *G06F 1/206* (2013.01); *G06F 17/30312* (2013.01); *Y02B 60/1275* (2013.01); *Y02B 60/188* (2013.01)

(58) Field of Classification Search
CPC ............ G06F 17/30442; G06F 1/3203; G06F 17/30312
See application file for complete search history.

(56) References Cited

U.S. PATENT DOCUMENTS

| | | | |
|---|---|---|---|
| 6,356,889 B1 | 3/2002 | Lohman et al. | |
| 6,516,310 B2 | 2/2003 | Paulley | |
| 6,560,593 B1 | 5/2003 | Kosciuszko et al. | |
| 6,636,846 B1 | 10/2003 | Leung et al. | |
| 6,931,395 B2 | 8/2005 | Day et al. | |
| 6,957,211 B1 | 10/2005 | Tyulenev et al. | |
| 7,107,262 B2 | 9/2006 | Dettinger et al. | |
| 7,185,000 B1 | 2/2007 | Brown et al. | |
| 7,523,094 B1 | 4/2009 | Thiemann et al. | |
| 7,602,570 B2 | 10/2009 | De Boer | |
| 7,653,826 B1 | 1/2010 | Day et al. | |
| 7,941,426 B2 | 5/2011 | Bestgen et al. | |
| 8,312,007 B2 | 11/2012 | Bestgen et al. | |
| 2003/0158842 A1 | 8/2003 | Levy et al. | |
| 2005/0120000 A1 | 6/2005 | Ziauddin et al. | |
| 2005/0228779 A1 | 10/2005 | Chaudhuri et al. | |
| 2005/0273552 A1* | 12/2005 | Brazis et al. | ............ 711/104 |
| 2005/0289098 A1 | 12/2005 | Barsness et al. | |
| 2006/0004695 A1 | 1/2006 | Day et al. | |
| 2006/0218118 A1 | 9/2006 | Gupta | |
| 2006/0274622 A1 | 12/2006 | De Boer | |
| 2007/0050328 A1 | 3/2007 | Li et al. | |
| 2008/0104014 A1 | 5/2008 | Burger et al. | |
| 2008/0147593 A1 | 6/2008 | Ramesh et al. | |

(Continued)

OTHER PUBLICATIONS

Page 1 in the 2002 definition of "query" at: http://web.archive.org/web/20020808193042/http://www.webopedia.com/TERM/Q/query.html.*

(Continued)

*Primary Examiner* — Leslie Wong
(74) *Attorney, Agent, or Firm* — Patterson & Sheridan, LLP (57) ABSTRACT

Embodiments of the invention provide techniques for optimizing database queries for energy efficiency. In general, a query optimizer is configured to compare energy requirements of query plans, and to select a query plan requiring minimal energy to execute. In one embodiment, the query optimizer may also compare time performance of the query plans, and may select a query plan by matching to a user preference for a relative priority between energy requirements and time performance.

20 Claims, 9 Drawing Sheets

(56) References Cited

U.S. PATENT DOCUMENTS

2009/0150413 A1 6/2009 Basu et al.
2009/0281986 A1 11/2009 Bestgen et al.
2009/0281992 A1 11/2009 Bestgen et al.

OTHER PUBLICATIONS

Page 1 in the 2002 definition of "database" at: http://web.archive.org/web/20020818053716/http://www.webopedia.com/term/d/database.html.*

Jayaprakash Pisharath et al., "Reducing Energy Consumption of Queries in Memory-Resident Database Systems", Proceedings of the 2004 International Conference on Compilers, Architecture, and Synthesis for Embedded Systems; pp. 35-45; ISBN 1-58113-890-3; Sep. 22-25, 2005; Washington, DC.

Sun, Jun-Zhao, Query Optimization Based on User-Specified Delay Item for Wireless Sensor Networks, Proceedings of the 2007 international conference on Wireless communications and mobile computing, Aug. 2007, pp. 493-498, New York, New York, United States, Not legible.

Ren, Qingchun et al., A Quality-Guaranteed and Energy-Efficient Query Processing Algorithm for Sensor Networks, Information Sciences: an International Journal, May 2007, pp. 2188-2205, vol. 177, Issue 10, Elsevier Science Inc., New York, New York, United States, Not legible.

Dutta, Prabal K. et al., System Software Techniques for Low-Power Operation in Wireless Sensor Networks, Proceedings of the 2005 IEEE/ACM International conference on Computer-aided design, Nov. 2005, pp. 924-931, IEEE Computer Society, Washington, DC, United States, Not legible.

Jayaprakash Pisharath et al.; "Energy Management Schemes for Memory-Resident Database Systems", pp. 218-227, CIKM 2004, Nov. 8-13, 2004, Washington, DC, USA, Not legible.

Alonso, Rafael et al., "Energy Efficient Query Optimization", 1992.

Graefe, Goetz "Database Servers Tailored to Improve Energy Efficiency", Proceedings from SETMDM '08, Mar. 29, 2008, Nantes, France, Not legible.

Somers, Marc Steven, "Impact of Webpage Access on the Design of Single-Chip Heterogeneous Multiprocessors", thesis, Virginia Tech, http://scholar.lib.vt.edu/theses/available/etd-05022007-144636/unrestricted/msomers_thesis_etd_mod.pdf, Apr. 27, 2007, pp. 1-103.

Somers, Marc Steven, "Impact of Webpage Access on the Design of Single-Chip Heterogeneous Multiprocessors", thesis, Virginia Tech, http://scholar.lib.vt.edu/theses/available/etd-05022007-144636/unrestricted/msomers_thesis_etd_mod.pdf, Apr. 27, 2007, pp. 104-193.

* cited by examiner

ORGANIZING DATABASES FOR ENERGY EFFICIENCY

BACKGROUND OF THE INVENTION

1. Field of the Invention

The invention generally relates to computer database systems. More particularly, the invention relates to techniques for optimizing database queries for energy efficiency.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc.), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to form a new table returned as a set of query results.

A user of a relational database may compose a query to specify tables and columns to retrieve data from. A query may also specify how the data is to be joined, as well as conditions (predicates) that must be satisfied for a particular data item to be included in a query result table. Current relational databases require that queries be composed in query languages. A commonly used query language is Structured Query Language (SQL). However, other query languages are also used.

Once composed, a query is executed by the DBMS. Typically, the DBMS interprets the query to determine a set of steps (hereafter referred to as a "query plan") that must be carried out to execute the query. However, in most cases, there are alternative query plans that can be carried out to execute a given query. Thus, the DBMS often includes a query optimizer, which selects the query plan that is likely to have the best time performance (i.e., to execute the fastest), or the query plan that is likely to require the fewest system resources (e.g., memory allocation, processing bandwidth, etc.).

SUMMARY OF THE INVENTION

One embodiment of the invention provides a computer-implemented method, comprising: accessing historical data describing one or more database queries executed on a database; predicting, based on the historical data, uses of one or more elements of the database; determining, on the basis of the predicted uses of the respective elements, a storage location, such that the energy consumption required to execute the query is minimized; and moving each of the one or more elements of the database to the respective determined location.

Another embodiment of the invention provides a computer readable storage medium containing a program which, when executed, performs an operation, comprising: accessing historical data describing one or more database queries executed on a database; predicting, based on the historical data, uses of one or more elements of the database; determining, on the basis of the predicted uses of the respective elements, a storage location, such that the energy consumption required to execute the query is minimized; and moving each of the one or more elements of the database to the respective determined location.

Yet another embodiment of the invention includes a system, comprising: a database; a processor; and a memory containing a program. When executed by the processor, the program is configured to perform an operation, comprising: accessing historical data describing one or more database queries executed on a database; predicting, based on the historical data, uses of one or more elements of the database; determining, on the basis of the predicted uses of the respective elements, a storage location, such that the energy consumption required to execute the query is minimized; and moving each of the one or more elements of the database to the respective determined location.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

A database management system (DBMS) often includes a query optimizer, which selects a query plan for executing a database query. Conventionally, the query optimizer is configured to determine a query plan that is likely to have the best time performance (i.e., to execute the fastest), or the query plan that is likely to require the fewest system resources (e.g., memory allocation, processing bandwidth, etc.). However, conventional query optimizers ignore the energy required by a computer for executing the query plan. Thus, query plans may be selected which result in fast query execution, but which are inefficient in energy consumption.

Embodiments of the invention provide techniques for optimizing database queries for energy efficiency. In general, a query optimizer is configured to compare energy requirements of query plans, and to select a query plan requiring minimal energy to execute. In one embodiment, the query optimizer may also compare time performance of the query plans, and may select a query plan by matching to a user preference for a relative priority between energy requirements and time performance.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
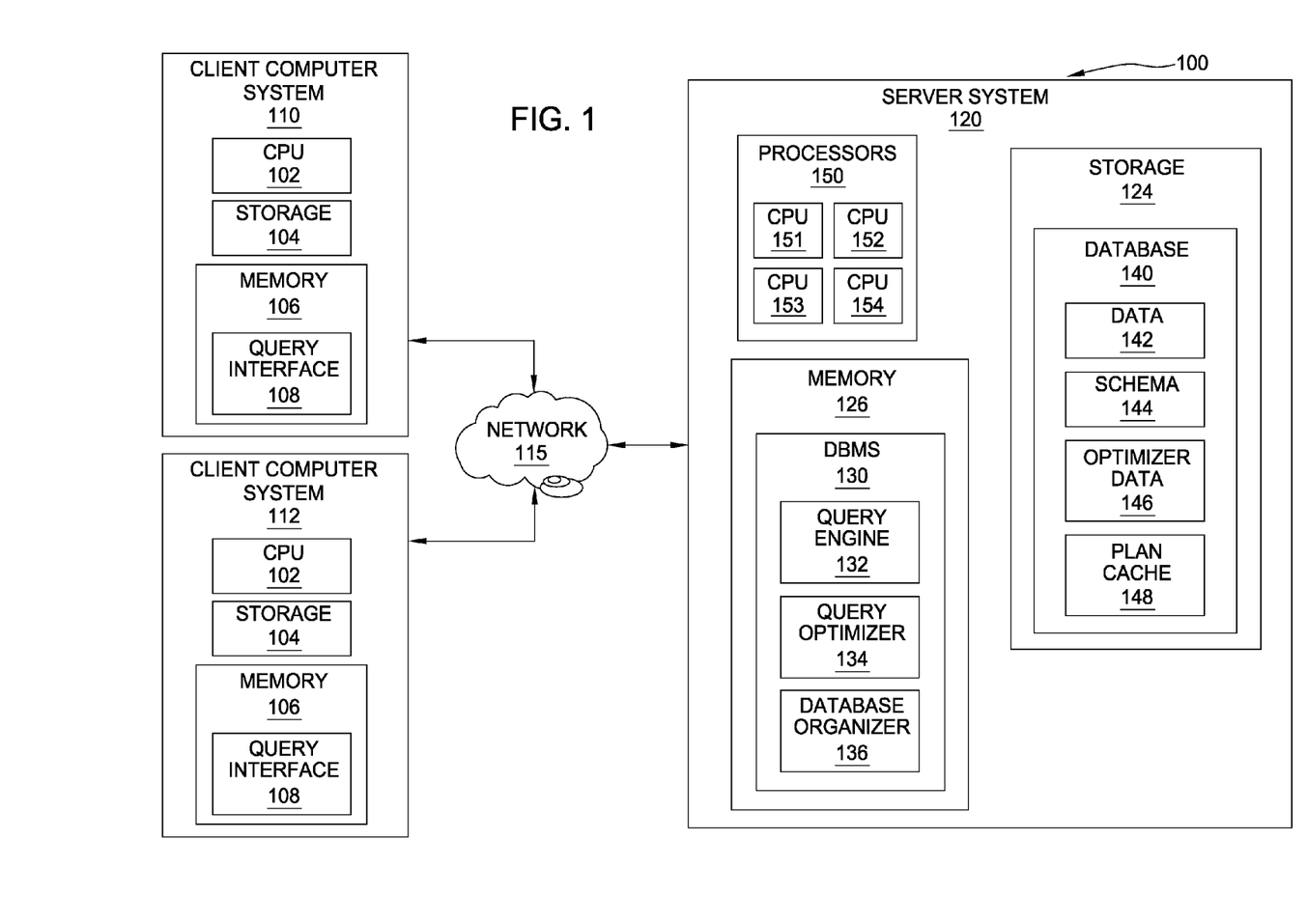
FIG. 1 is a block diagram that illustrates a client server view of computing environment, according to one embodiment of the invention.

FIG. 1 is a block diagram that illustrates a client server view of computing environment 100, according to one embodiment of the invention. As shown, computing environment 100 includes two client computer systems 110 and 112, network 115 and server system 120. In one embodiment, the computer systems illustrated in environment 100 may include existing computer systems, e.g., desktop computers, server computers laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, client computer systems 110 and 112 each include a CPU 102, storage 114 and memory 106, typically connected by a bus (not shown). CPU 102 is a programmable logic device that performs all the instruction, logic, and mathematical processing in a computer. Storage 104 stores application programs and data for use by client computer systems 110 and 112. Storage 104 includes hard-disk drives, flash memory devices, optical media and the like. The network 115 generally represents any kind of data communications network. Accordingly, the network 115 may represent both local and wide area networks, including the Internet. The client computer systems 110 and 112 are also shown to include a query tool 108. In one embodiment, the query tool 108 is software application that allows end users to access information stored in a database (e.g., database 140). Accordingly, the query tool 108 may allow users to compose and submit a query to a database system, which, in response, may be configured to process the query and return a set of query results. The query tool 108 may be configured to compose queries in a database query language, such as Structured Query Language (SQL). However, it should be noted that the query tool 108 is only shown by way of example; any suitable requesting entity may submit a query (e.g., another application, an operating system, etc.).

In one embodiment, the server system 120 includes processors 150, storage 124, and memory 126. The processors 150 represent one or more computer processors. For example, the processors 150 may be a single central processing unit (CPU), multiple CPUs, a CPU having multiple processing cores, etc. In this example, the processors 150 are illustrated as including four CPUs 151, 152, 153 and 154. The storage 124 may store a database 140, which includes data 142, schema 144, optimizer data 146 and plan cache 148. The data 142 represents the substantive data stored by the database 140. The schema 144 represents the structure of the elements of the database 140 (i.e., tables, fields, keys, etc.). The plan cache 148 may be a data structure storing query plans generated by the query optimizer, as well as auxiliary data (e.g., temporary indexes, tables, etc.) used in generating query plans. The query plans and auxiliary data stored in the plan cache 148 may be used for optimizing subsequent queries, thus reducing the amount of processing required by the query optimizer 134. Further, the plan cache 148 may include historical data of past uses of the database 140 (e.g., most commonly-used queries, tables, indexes, etc.)

In one embodiment, the optimizer data 146 may include various elements of metadata describing characteristics of the database 140 (e.g., database statistics such as frequent value lists, histograms, etc.). Further, the optimizer data 146 may include data describing time requirements of executing a query (e.g., typical time to spin up a hard-disk drive, time to read data from a drive, time to process a given query operation, etc.). Furthermore, the optimizer data 146 may include data describing the energy consumption associated to the use of the database 140. For example, the optimizer data 146 may include data describing the energy required to bring an idle hard-disk drive up to operating speed (i.e., to "spin up" a drive). In another example, the optimizer data 146 may include data describing the energy required by cooling devices (e.g., fans) to cool the processors 150 at various levels of processing loads (i.e., at idle, at intermittent load, at full load, etc.). In yet another example, the optimizer data 146 may include data describing the energy required for performing various query optimizations (i.e., the energy required for operating the query optimizer 134).

The memory 126 may include a database management system (DBMS) 130. The DBMS 130 provides a software application used to organize, analyze, and modify information stored in the database 140. The DBMS 130 includes a query engine 132, a query optimizer 134 and a database organizer 136.

In one embodiment, the database organizer 136 may be a software application configured to organize the physical structure of the database 140 in an efficient manner. More specifically, the database organizer 136 may be configured to optimize the structure of the database 140 for efficiency under predicted future uses. The future uses may be predicted by extrapolating from historical data of past uses of the database 140, which may be stored, e.g., in the plan cache 148. Optionally, the future use of the database 140 may be specified by a user interacting with configuration settings. The database structure may be optimized for time performance, for resource efficiency, for energy efficiency, or some combination of these factors. The functionality of the database organizer 136 is discussed in further detail below with reference to FIGS. 2-3.

Figure 2:
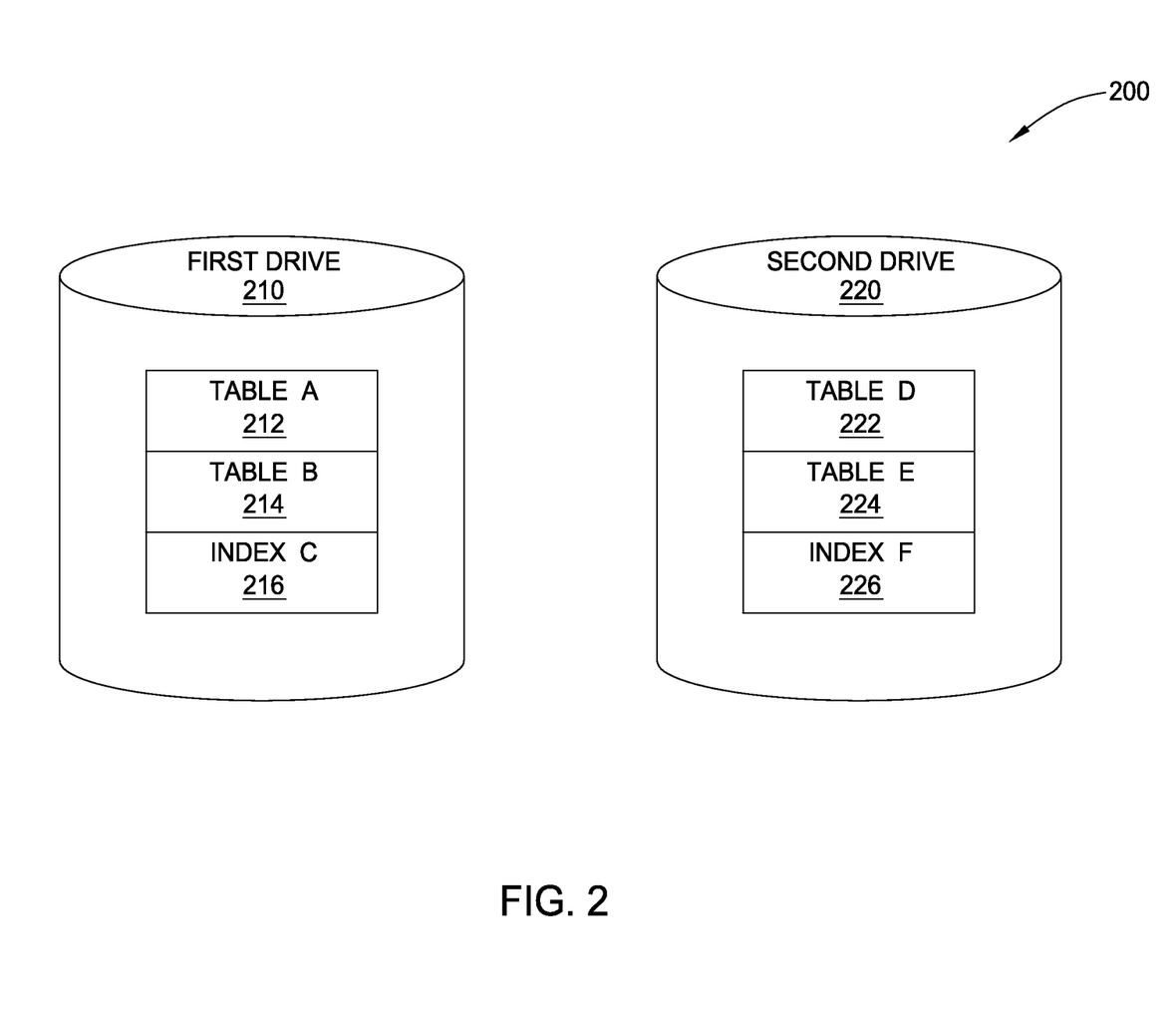
FIG. 2 illustrates a conceptual view of elements of a database stored in multiple physical drives, according to one embodiment of the invention.

FIG. 2 illustrates a conceptual view 200 of elements of a database stored in multiple physical drives, according to one embodiment of the invention. In this example, a first drive 210 stores table A 212, table B 214 and index C 216; a second drive 220 stores table C 222, table D 224 and index E 226. Thus, FIG. 2 illustrates the concept that elements of a single database may be distributed across multiple physical drives.

Figure 3:
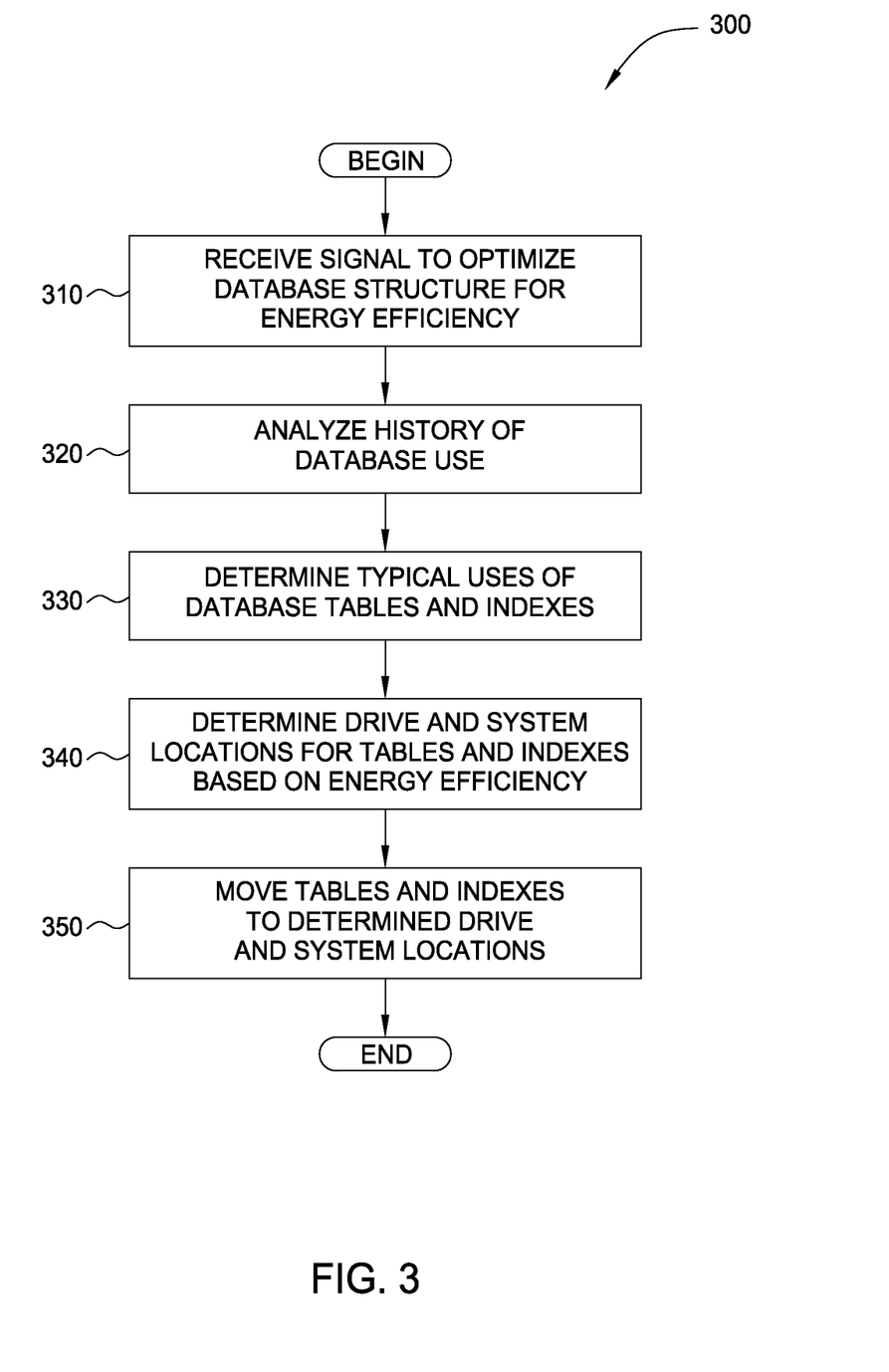
FIG. 3 is a flow diagram illustrating a method for organizing the physical structure of a database in an efficient manner, according to one embodiment of the invention.

FIG. 3 is a flow diagram illustrating a method 300 for organizing the physical structure of a database in an efficient manner, according to one embodiment of the invention. Persons skilled in the art will understand that, even though the method is described in conjunction with the systems of FIGS. 1-2, any system configured to perform the steps of method 300, in any order, is within the scope of the present invention.

The method 300 begins at step 310, when a signal to optimize the structure of a database for energy efficiency is received. For example, the received signal may be generated automatically whenever the database 140 is modified, may be generated according to a predefined schedule of signals, or may be generated manually by a user request. Optionally, the signal may also indicate a user preference for the relative importance allocated to time performance and energy efficiency in optimizing the database structure. At step 320, data describing the historical use of the database is analyzed. For example, the database organizer 136 may analyze historical data stored in the plan cache 148.

At step 330, the typical uses of the database tables and indexes are determined from the analysis of the historical use of the database. For example, based on the pattern of most-frequently run queries, it may be determined which tables and indexes of the database are accessed in combination, as well as the frequency that each combination is accessed by database queries. Further, it may be determined what execution priorities are assigned to each type of query. For example, one set of tables may be accessed by a query run by an interactive reporting tool, and may thus require the fastest possible performance (i.e., fastest query execution). However, another set of tables may be accessed by a query run as part of a background maintenance process, and may thus not require fast performance.

At step 340, the drive and/or system locations for database tables and indexes may be determined based on energy efficiency. That is, the elements of the database 140 may assigned to the hard-disk drives included in the storage 124 so as to reduce energy consumption during query execution. Additionally, the elements of the database 140 may be stored in multiple system locations (e.g., in hard-disk drives included in multiple server systems). At step 350, the elements of the database 140 are moved to the drive and/or system locations determined at step 340. After step 350, the method 300 terminates. For example, referring to FIG. 2, assume that table A 212, table B 214 and index C 216 are determined to be most frequently used in combination to execute a particular query, and are thus physically stored together in first drive 210. Assume also that table C 222, table D 224 and index E 226 are determined to be used together for executing a second query, and are thus physically stored together in the second drive 220.

In one embodiment, the query optimizer 134 (shown in FIG. 1) may be configured to select an efficient query plan, or series of execution instructions, for executing a query. The query optimizer 134 may select an efficient query plan from multiple query plans based on the time performance and energy requirements of each query plan. That is, the query optimizer 134 may determine a time performance (i.e., minimum runtime) and an energy cost associated to each query plan.

In one embodiment, the query optimizer 134 may select a specific query plan that most closely matches a specified preference for a balance between the time performance and energy efficiency characteristics of query plans. For example, if a particular user of the database 140 has specified a preference to maximize time performance in query execution, the query optimizer 134 may select a query plan that is predicted to execute in a minimum time. On the other hand, if another user specifies a preference to minimize energy consumption for query execution, the query optimizer 134 may select a query plan that may not execute the fastest, but that will require the least energy to execute.

Further, the user may specify a preference for a given balance between the performance and energy characteristics of query plans. For example, a user may specify a percentage for each factor (e.g., 40% performance, 60% energy efficiency), indicating a relative importance to be allocated to each factor. The query optimizer 134 may be configured to calculate a time performance score and an energy efficiency score for each query plan, and then to multiply each score by the respective percentage, thus reflecting the relative importance specified by the user. In order to perform such balancing, the time performance and energy efficiency scores may be normalized. That is, the two performance estimates may be converted to a unit-less numbers, so as to allow comparison between the two aspects. For example, the query optimizer 134 may be configured to normalize the time performance estimates by dividing them by a time baseline, thus resulting in a unit-less ratio of estimated time performance to a baseline performance.

In another embodiment, the query optimizer 134 may select a query plan based on a maximum energy consumption level. That is, a user may specify the maximum energy consumption allowed for any query plan selected by the query optimizer 134. In yet another embodiment, the query optimizer 134 may be configured to evaluate the resource efficiency of a query plan, meaning the system resource cost of executing the query (e.g., memory allocation, processor use, etc.). The resource efficiency may be evaluated in addition to, or instead of, the time performance and energy efficiency of the query plans.

To make a determination of a query plan, the query optimizer 134 may utilize the optimizer data 146, which may describe characteristics of the database 140 included in the query. The query engine 132 may be configured to process database queries submitted by a requesting application (e.g., a query generated using query tool 108) and to return a set of query results to the requesting application. The query engine 132 may execute a query according to a query plan provided by the query optimizer 134.

Figure 4:
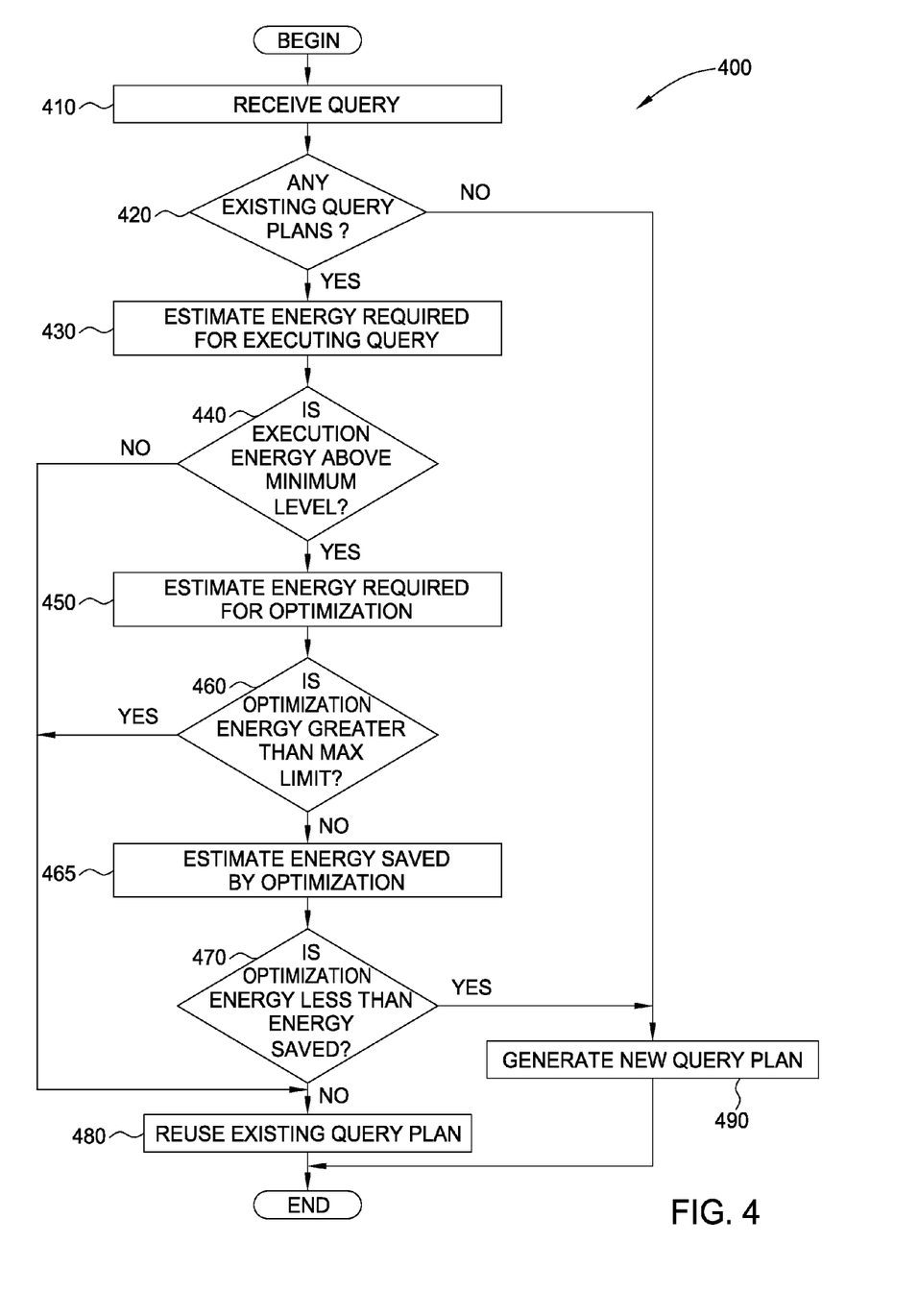
FIG. 4 is a flow diagram illustrating a method for determining whether to perform a query optimization based on energy efficiency, according to one embodiment of the invention.

FIG. 4 is a flow diagram illustrating a method 400 for determining whether to perform a query optimization based on energy efficiency, according to one embodiment of the invention. Persons skilled in the art will understand that, even though the method is described in conjunction with the system of FIG. 1, any system configured to perform the steps of method 400, in any order, is within the scope of the present invention.

The method 400 begins at step 410, when a query is received. For example, a query may be created by a user interacting with a query tool 108, and may be received by a DBMS 130 on a server system 120. At step 420, it is determined whether there are any existing query plans that may be used for efficiently executing the query. For example, a plan cache 148 may store an existing query plan for executing the received query. If there is no suitable existing query plan, then at step 490, a new query plan is generated. Step 490 may be performed, for example, by the query optimizer 134 shown in FIG. 1. However, if it is determined at step 420 that there is a suitable existing query plan, then at step 430, the energy required to execute the query is estimated. For example, the query optimizer 134 may be configured to estimate the energy required to execute the received query, including energy required to spin hard-drive disks in the storage 124, to power the processors 150, etc. This calculation may be based on predefined energy consumption standards for executing given query types. This calculation may also be based on historical data of energy consumed in past instances of executing the same query (or similar queries). The historical data of energy consumed may be determined, for example, by metering the electrical power consumption of the server system 120 during query execution. Such energy consumption standards and historical data may be stored in the plan cache 148 and/or the optimizer data 146.

At step 440, it is determined whether the energy for executing the query (estimated at step 430) exceeds a predefined minimum energy level. If not, then at step 480, an existing query plan is followed to execute the query. For example, if the energy required to execute a query is estimated to be below a minimum level specified by a user, it may be desirable to bypass any energy optimization processes, and simply use an existing query plan to execute the query. However, if it is determined at step 440 that the estimated energy for executing the query exceeds the predefined minimum level, then at step 450, the energy required to perform a query optimization is estimated. For example, the query optimizer 134 may be configured to estimate the energy required to perform an optimization of the received query, including energy required to spin hard-drive disks in the storage 124, to power the processors 150, to generate query plans, etc. This calculation may be based on predefined energy consumption standards for typical query optimizations. This calculation may also be based on historical data of energy consumed in past instances of optimizing the same query (or similar queries). Such energy consumption standards and historical data may be stored in the plan cache 148 and/or the optimizer data 146.

At step 460, it is determined whether the optimization energy (estimated at step 450) exceeds a predefined maximum limit on energy to be consumed for performing a query optimization. If so, then at step 480, an existing query plan is followed to execute the query. For example, if the energy required to perform a query optimization exceeds a maximum limit specified by a user, it may be desirable to use an existing query plan to execute the query. However, if it is determined at step 460 that the optimization energy (estimated at step 450) does not exceed the predefined maximum limit, then at step 465, the amount of energy saved by the query optimization is estimated. For example, the query optimizer 134 (shown in FIG. 1) may be configured to estimate the energy saved by executing the optimized query instead of an existing query plan. This calculation may be based on predefined energy consumption standards and/or historical data for executing optimized queries. Such energy consumption standards and historical data may be stored in the plan cache 148 and/or the optimizer data 146.

At step 470, it is determined whether the optimization energy (estimated at step 450) is less than the energy saved by performing the query optimization (estimated at step 465). If so, then at step 490, a new query plan is generated. Step 490 may be performed, for example, by the query optimizer 134 shown in FIG. 1. However, if it is determined at step 470 that the optimization energy is not less than the energy required for executing the optimized query, then at step 480, an existing query plan is followed to execute the query. After either step 480 or step 490, the method 400 terminates.

In one embodiment, the method 400 may include consideration of energy savings over multiple instances of use of an efficient query plan. For example, step 470 may be modified to consider the number of times that a query is likely to be executed. Thus, the energy cost of generating a new query plan may be amortized over a number of instances that the query plan is likely to be used in the future. That is, even if the energy required to generate the query plan exceeds the energy saved by one instance of using the query plan, generating a new query plan may be beneficial if it is used a sufficient number of times, resulting in a total energy savings that is greater than the energy cost.

Figure 5:
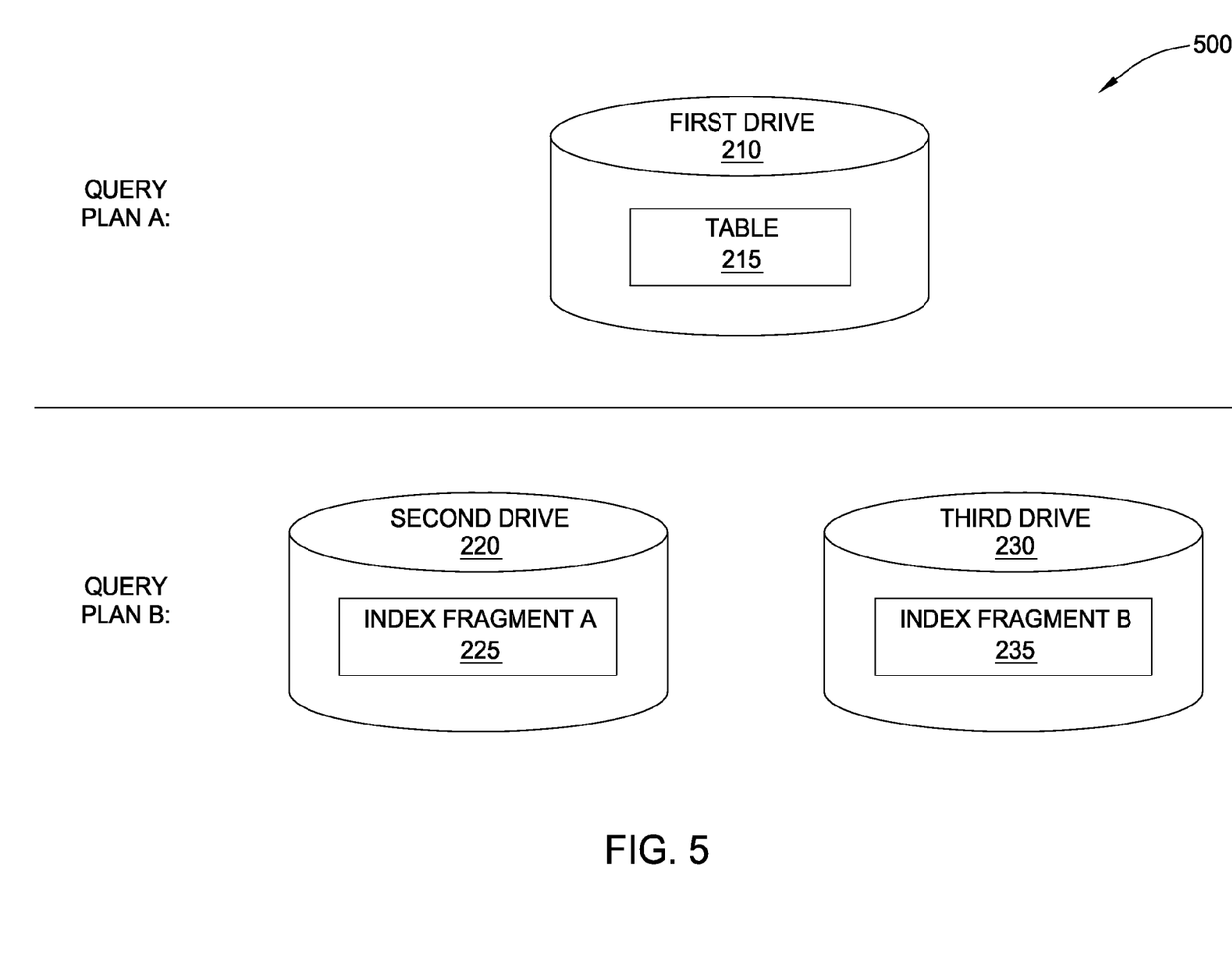
FIG. 5 illustrates a conceptual view of elements of a database used in alternative query plans, according to one embodiment of the invention.

In one embodiment, the query optimizer 134 may be configured to select an efficient query plan based on the time performance and energy efficiency characteristics of each query plan. FIG. 5 illustrates a conceptual view 500 of elements of a database used in alternative query plans, according to one embodiment of the invention. In this example, under a query plan A, a query may be executed by accessing a table 215 stored in a first drive 210. Alternatively, under a second query plan B, the same query may be executed by accessing an index stored in two sections, namely in index fragment A 225 stored in a second drive 220 and in index fragment B 235 stored in a third drive 230. Assume that, since query plan B utilizes an index instead of a table, query plan B may result in faster execution of the query than query plan A. Assume also that query plan B requires that second drive 220 and third drive 230 be spun up from an idle state to execute the query, while query plan A only requires that first drive 210 to be spun up. The electrical energy required to spin up a hard-disk drive may represent a significant portion of the energy consumed in executing a query. Thus, while query plan B may result in faster query execution than query plan A, it may also require significantly more energy than query plan A. Accordingly, in the situation that a user has specified a higher priority for energy efficiency than for time performance, the query optimizer 134 may select query plan A rather than query plan B.

Figure 6A:
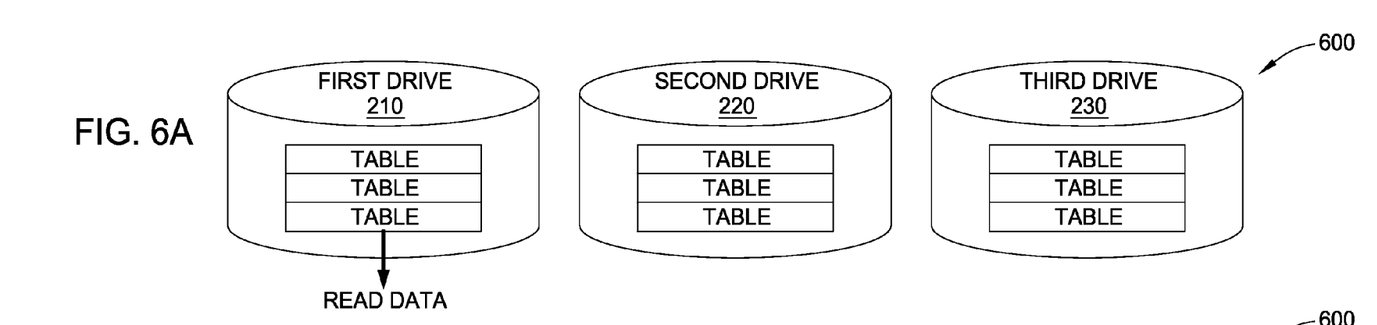
FIGS. 6A-6C illustrate a conceptual view of an energy-efficient query execution from multiple hard-disk drives, according to one embodiment of the invention.
Figure 6B:
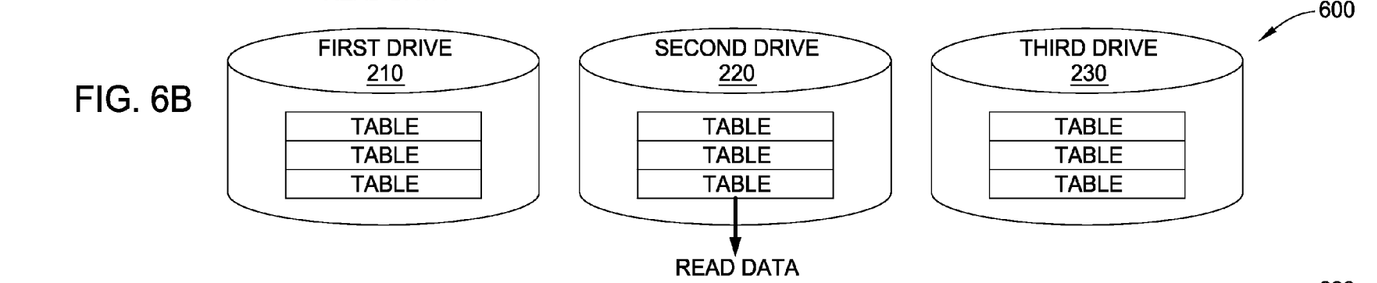
Figure 6C:
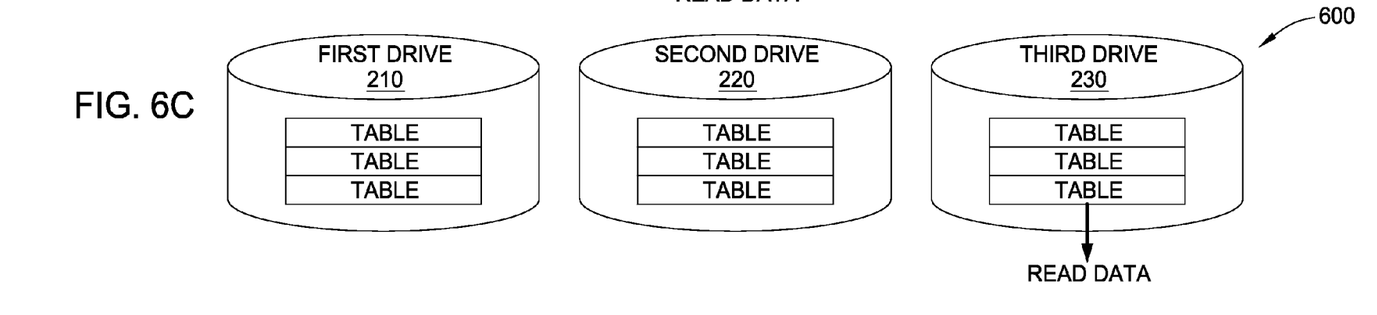

In one embodiment, the query optimizer 134 may be configured to reduce energy consumption during query execution by managing the order of reading data from storage drives. FIGS. 6A-6C illustrate a conceptual view 600 of an energy-efficient query execution from multiple hard-disk drives, according to one embodiment of the invention. More specifically, FIG. 6A illustrates a first stage of a query plan selected by the query optimizer 134, in which data is read solely from tables stored in a first drive 210. Similarly, FIG. 6B illustrates a second stage of the query plan, in which data is read solely from tables stored in a second drive 220. Finally, FIG. 6C illustrates a third stage of the query plan, in which data is read solely from tables stored in a third drive 230. This query plan, in which only one drive is in use at a given time, may have the effect of reducing the amount of heat generated by the drives included in storage 124, thus reducing the energy required to cool the server system 120 (e.g., the electrical energy required for cooling fans, refrigeration devices, solid-state devices, etc.). Alternatively, a query plan in which all drives are used simultaneously may have faster data throughput, and may thus result in faster query execution. However, the simultaneous use of multiple drives may also result in greater heat generated by the drives, thus increasing the energy required to cool the server system 120.

In one embodiment, the query optimizer 134 may be configured to reduce energy consumption during query execution by managing the use of multiple processing units. More specifically, assuming the processors 150 include multiple processors, a query may be executed by a single processor, rather than by multiple processors acting in parallel. Such an approach may increase the time required to execute the query, but may reduce the energy required to cool the server system 120. Alternatively, a query plan in which all available processors 150 are used simultaneously may result in faster query execution, but may result in greater heat generated by the CPUs, thus increasing the energy required to cool the server system 120. Accordingly, in the situation that a user has specified a preference for energy efficiency in query execution, the query optimizer 134 may select a query plan in which a single processor is used. In another embodiment, a query may be processed on multiple processors in a serial fashion. That is, the query may be partially processed on only one processor at a time. Once the active processor reaches a critical threshold (e.g., a given temperature, time duration, etc.), it may be shut down, and query processing may continue on another processor. This process may continue in turn for all available processors, and may then return to the first processor.

Figure 7A:
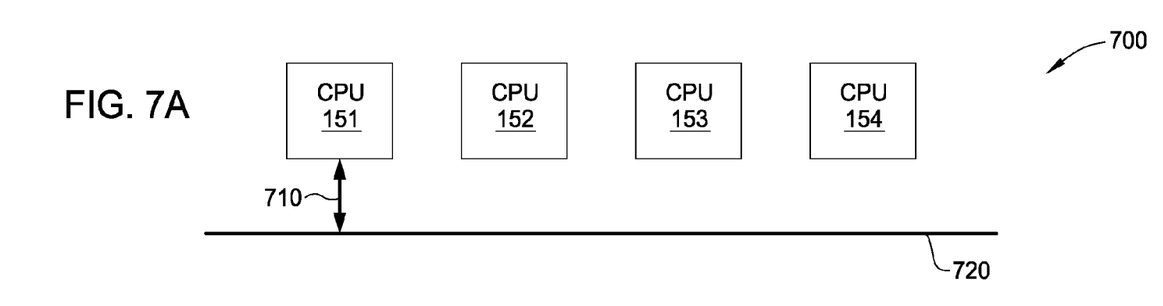
FIGS. 7A-7C illustrate a conceptual view of an energy-efficient query execution using multiple CPUs, according to one embodiment of the invention.
Figure 7B:
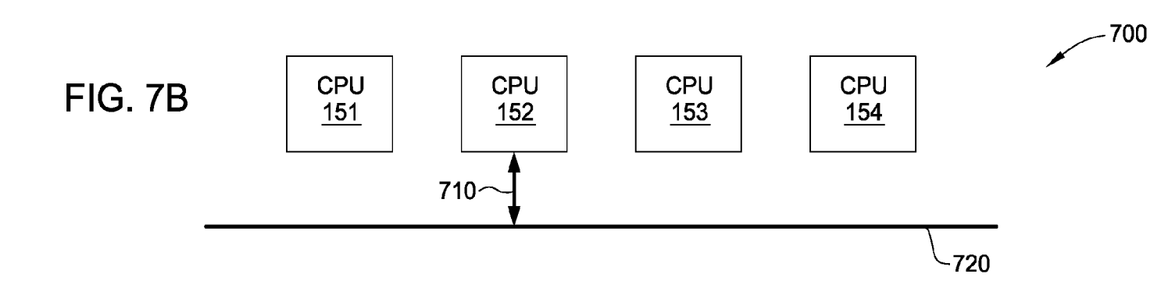
Figure 7C:
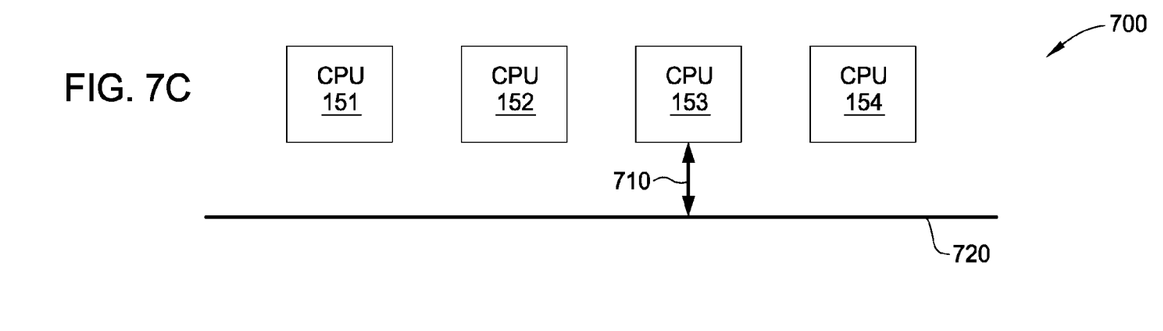

FIGS. 7A-7C illustrate a conceptual view 700 of an energy-efficient query execution using multiple CPUs, according to one embodiment of the invention. More specifically, FIG. 7A illustrates a first stage of a query plan selected by the query optimizer 134, in which the query is processed by a first CPU 151. The active first CPU 151 interacts with a bus 720 (illustrated by the arrow 710). Once the first CPU 151 reaches a critical threshold (e.g., a critical temperature, a defined time period, a defined number of process cycles, etc.), the first CPU 151 may be shut down. FIG. 7B illustrates a second stage of the selected query plan, in which the query processing is continued by a second CPU 152. FIG. 7C illustrates a third stage of the selected query plan, in which the second CPU 152 is shut down, and the query processing is continued by a third CPU 153. The illustrated approach, in which only one CPU is in use at a given time, may reduce the amount of heat generated by the CPUs included in the processors 150, thus reducing the total energy required to cool the server system 120 (e.g., the electrical energy required for cooling fans, refrigeration devices, solid-state devices, etc.).

Figure 8:
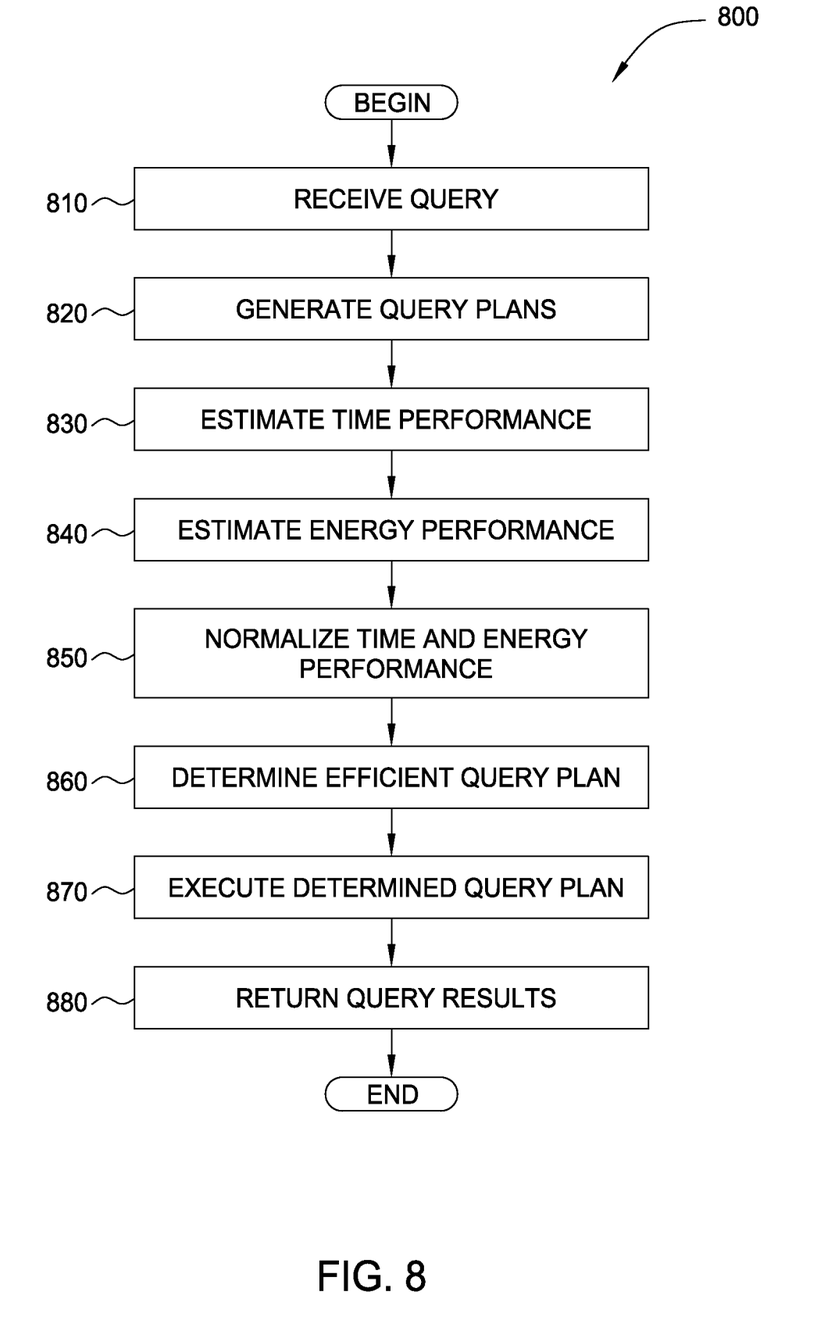
FIG. 8 is a flow diagram illustrating a method for optimizing a database query for energy efficiency, according to one embodiment of the invention.

FIG. 8 is a flow diagram illustrating a method 800 for optimizing a database query for energy efficiency, according to one embodiment of the invention. Persons skilled in the art will understand that, even though the method is described in conjunction with the system of FIG. 1, any system configured to perform the steps of method 800, in any order, is within the scope of the present invention.

The method 800 begins at step 810, when a database query is received. For example, a query may be created by a user interacting with a query tool 108, and may be received by a DBMS 130 on a server system 120. At step 820, query plans for executing the received query may be generated. For example, the query optimizer 134 (shown in FIG. 1) may be configured to generate query plans. Optionally, the query optimizer 134 may also be configured to retrieved existing query plans from the plan cache 148.

At step 830, the time performance of each of the query plans is estimated. For example, the query optimizer 134 may be configured to analyze data stored in the optimizer data 146 (e.g., database statistics, time benchmarks, etc.) in order to estimate the time required for executing the various query plans. At step 840, the energy performance of each query plan is estimated. For example, the query optimizer 134 may be configured to analyze data stored in the optimizer data 146 in order to estimate the energy required for executing the various query plans (e.g., the electrical energy required for cooling fans, for spinning up hard-disk drives, etc.).

At step 850, the time and energy performance estimates of each query plan are normalized. That is, the two performance estimates may be converted to a unit-less numbers, so as to allow comparison between the two aspects. For example, the query optimizer 134 may be configured to normalize the time performance estimates by dividing them by a time baseline, thus resulting in a unit-less ratio of estimated time performance to a baseline performance. At step 860, a query plan for executing the query is determined based on a user setting indicating a relative priority between energy efficiency and time performance. For example, in the event that a user has defined an absolute preference for energy efficiency, the query optimizer 134 may be configured to select a query plan based solely on the estimated energy performance of each query plan. In another example, in the event that the user has defined an equal preference for energy efficiency and time performance, the query optimizer 134 may be configured to select a query plan resulting in equal time and energy performance (i.e., 50% energy, 50% time).

At step 870, the determined query plan may be followed in order to execute the query. For example, the determined query plan may be carried out by the query engine 132 illustrated in FIG. 1. At step 880, the query results may be returned. For example, the query results produced by query engine 132 according to the determined query plan may be presented to a user in the query tool 108. After step 880, the method 800 terminates.

Figure 9:
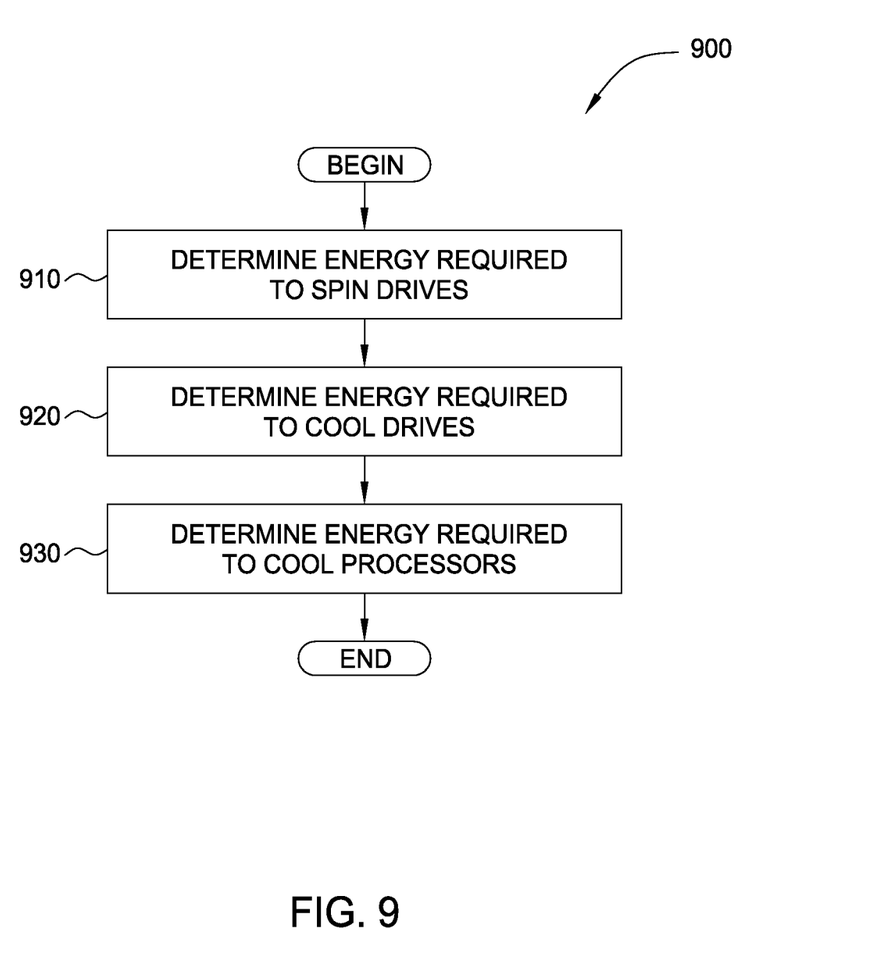
FIG. 9 is a flow diagram illustrating a method for estimating the energy efficiency of a query plan, according to one embodiment of the invention.

FIG. 9 is a flow diagram illustrating a method 900 for estimating the energy efficiency of a query plan, according to one embodiment of the invention. The method 900 represents one embodiment of the step 840 of the method 800 illustrated in FIG. 8. Persons skilled in the art will understand that, even though the method is described in conjunction with the system of FIG. 1, any system configured to perform the steps of method 900, in any order, is within the scope of the present invention.

The method 900 begins at step 910 by determining the energy required to spin any hard-disk drives used in executing the query plan (i.e., the query plan generated in step 820 of the method 800, as shown in FIG. 8). For example, the query optimizer 134 may be configured to determine the electrical energy required to spin the first drive 210 used in executing the query plan A, as shown in FIG. 2.

At step 920, the energy required to cool the hard-disk drives may be determined. For example, the query optimizer 134 may be configured to determine the electrical energy required to cool the second drive 220 and the third drive 230 used in executing the query plan B, as shown in FIG. 2. At step 930, the energy required to cool any processors required to process the query may be determined. For example, the query optimizer 134 may be configured to determine the electrical energy required to cool the CPU 151, the CPU 152 and the CPU 153 during execution of a query, as shown in FIGS. 7A-7C. For both steps 920 and 930, the energy required for cooling may represent, e.g., electrical energy consumed by cooling fans, refrigeration devices, solid-state devices, etc.). After step 930, the method 900 terminates.

In one embodiment, the query optimizer 134 may be configured to detect changes to the database 140 that may affect the energy consumption required for executing a query, and to issue warnings of the effects of such changes. For example, assume a query may be executed using an efficient query plan which utilizes an index stored on a particular drive. Assume further that a user issues a command to move the index to a different drive. In such a situation, the query optimizer 134 may be configured to notify the user that moving the index may result in greater energy consumption in executing the query. The user may then be allowed to undo the command or action that altered the database 140.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
 accessing historical data describing one or more database queries executed on a database;
 predicting, based on the historical data, uses of one or more elements of the database;
 determining, on the basis of the predicted uses of the respective elements, a storage location for the one or more elements that minimizes the energy consumption required to execute the query; and
 moving each of the one or more elements of the database to the respective determined storage location.

2. The computer-implemented method of claim 1, wherein at least one storage location is a particular hard-disk drive.

3. The computer-implemented method of claim 1, wherein at least one storage location is a particular server system.

4. The computer-implemented method of claim 1, wherein determining the storage location comprises grouping elements of the database that are commonly used together, and determining a location in which to store each group of elements.

5. The computer-implemented method of claim 1, wherein the one or more elements are selected from: (i) tables of the database and (ii) indexes of the database.

6. The computer-implemented method of claim 1, wherein determining the storage location comprises determining a time performance and one or more energy requirements for executing a database query.

7. The computer-implemented method of claim 6, wherein determining the storage location is based on a user preference for a relative priority of the time performance and the one or more energy requirements.

8. A non-transitory computer readable storage medium containing a program which, when executed, performs an operation, comprising:
 accessing historical data describing one or more database queries executed on a database;
 predicting, based on the historical data, uses of one or more elements of the database;
 determining, on the basis of the predicted uses of the respective elements, a storage location for the one or more elements that minimizes the energy consumption required to execute the query; and
 moving each of the one or more elements of the database to the respective determined storage location.

9. The non-transitory computer readable storage medium of claim 8, wherein at least one storage location is a particular hard-disk drive.

10. The non-transitory computer readable storage medium of claim 8, wherein at least one storage location is a particular server system.

11. The non-transitory computer readable storage medium of claim 8, wherein determining the storage location comprises grouping elements of the database that are commonly used together, and determining a location in which to store each group of elements.

12. The non-transitory computer readable storage medium of claim 8, wherein the one or more elements are selected from: (i) tables of the database and (ii) indexes of the database.

13. The non-transitory computer readable storage medium of claim 8, wherein determining the storage location comprises determining a time performance and one or more energy requirements for executing a database query.

14. The non-transitory computer readable storage medium of claim 13, wherein determining the storage location is based on a user preference for a relative priority of the time performance and the one or more energy requirements.

15. A system, comprising:
 a database;
 a processor; and a memory containing a program, which when executed by the processor is configured to perform an operation, comprising:
  accessing historical data describing one or more database queries executed on a database;
  predicting, based on the historical data, uses of one or more elements of the database;
  determining, on the basis of the predicted uses of the respective elements, a storage location for the one or more elements that minimizes the energy consumption required to execute the query; and
  moving each of the one or more elements of the database to the respective determined storage location.

16. The system of claim 15, wherein at least one storage location is a particular hard-disk drive.

17. The system of claim 15, wherein at least one storage location is a particular server system.

18. The system of claim 15, wherein determining the storage location comprises grouping elements of the database that are commonly used together, and determining a location in which to store each group of elements.

19. The system of claim 15, wherein the one or more elements are selected from: (i) tables of the database and (ii) indexes of the database.

20. The system of claim 15, wherein determining the storage location comprises determining a time performance and one or more energy requirements for executing a database query.

* * * * *